United States Patent [19]

Dulin et al.

[11] Patent Number: 4,724,153
[45] Date of Patent: Feb. 9, 1988

[54] SOFT-FROZEN WATER-ICE FORMULATION

[75] Inventors: Gary T. Dulin, Irvington; Marnie L. DeGregorio, Valley Cottage, both of N.Y.; Peter C. Erickson, Langhorne, Pa.; Bruce A. Cole, Princeton, N.J.

[73] Assignee: General Foods Corporation, White Plains, N.Y.

[21] Appl. No.: 908,061

[22] Filed: Sep. 16, 1986

Related U.S. Application Data

[63] Continuation-in-part of Ser. No. 780,476, Sep. 26, 1986, abandoned.

[51] Int. Cl.⁴ .............................................. A23G 9/02
[52] U.S. Cl. ..................................... 426/565; 426/566
[58] Field of Search ........................ 426/565, 566, 567

[56] References Cited

U.S. PATENT DOCUMENTS

| | | | |
|---|---|---|---|
| 4,293,580 | 10/1981 | Rubenstein | 426/565 |
| 4,297,379 | 10/1981 | Topalian et al. | 426/565 |
| 4,368,211 | 1/1983 | Blake et al. | 426/564 |
| 4,400,405 | 8/1983 | Morley et al. | 426/565 |
| 4,452,823 | 6/1984 | Connolly et al. | 426/115 |
| 4,452,824 | 6/1984 | Cole et al. | 426/565 |
| 4,609,561 | 9/1986 | Wade et al. | 426/565 |

FOREIGN PATENT DOCUMENTS 1446144  8/1976  United Kingdom ............... 426/565

Primary Examiner—Jeanette Hunter
Attorney, Agent, or Firm—Thomas R. Savoie; Daniel J. Donovan

[57] ABSTRACT

An aerated soft-frozen, fat-free protein-free water-ice product which is extrudable at 0° to 10° F., said product containing a critical level of chemical emulsifier in order to effect desirable textural characteristics.

6 Claims, No Drawings

SOFT-FROZEN WATER-ICE FORMULATION

This application is a continuation-in-part of U.S. patent application, Ser. No. 780,476, filed Sept. 26, 1986, now abandoned.

BACKGROUND OF THE INVENTION

This invention provides a new frozen novelty product, principally for dessert or snack use, that emulates the textural and rheological characteristics of soft ice cream while at home freezer temperatures (e.g. 0° F. to 10° F.). The invention embraces a combination of ingredients which define a new soft, frozen water-ice product.

Soft serve ice creams or soft serve ice milks are popular desserts with wide appeal. Distinguishing features of these soft serve products are that they are frozen in a special soft serve freezer, are dispensed by extrusion at carefully chosen subfreezing temperatures and they stand up in a cone or dish upon extrusion. Conventional soft serve products are usually dispensed at an overrum on the order of 40% to 60%. Soft serve products of this character have been known for many years, however, its availability is primarily from stores having special freezers that dispense the product for immediate consumption.

These soft serve products must be dispensed at temperatures between 16° F. and 24° F. (−9° C. to −4° C.). At lower temperatures, the product is no longer soft. Conventional soft serve products accordingly are not suited for sale from grocery store freezers for home storage and use. Home freezers maintain temperatures generally around 0° F. to 10° F. (−18° C. to −12° C.), and store freezers, which as used herein includes grocery store, supermarket, and restaurant freezers, are generally kept at colder temperatures.

Considerable effort has been expended to develop a soft serve product for home use. U.S. Pat. No. 4,244,977 to Kahn, U.S. Pat. No. 4,219,581 to Dea et al., U.S. Pat. No. 4,145,454 to Dea et al., and U.S. Pat. No. 3,993,793 to Finney and U.K. Patent Specification No. 1,508,437 disclose frozen food products which supposedly are softer than conventional ice cream at freezer temperatures. There is considerable other published art on the subject of frozen desserts, particularly ice cream. A pertinent text is *Ice Cream*, Second Edition by W.S. Arbuckle, PhD., published in 1972 by the Avi Publishing Company, Inc., Westport, Conn.

U.S. Pat. Nos. 4,374,154 and 4,452,824 to Cole et al. described formulations for producing soft-from-the-freezer, fat-containing ice cream formulations which possess a highly desirable combination of softness, extrudability and storage stability. Both these patents are herein incorporated by reference.

DESCRIPTION OF THE INVENTION

This invention relates to an aerated, storage-stable, fat-free dessert product which is sufficiently soft from a home freezer (0° F. to 10° F.) to be extrudable. These products can be dispensed by hand from a collapsible package having an extrusion orifice. A squeeze package or a package having a mechanism to assist in applying pressure to the product may be utilized. The products of this invention have a high tolerance to freeze-thaw cycling and are able to be stored for prolonged periods between −10° F. and +10° F. without significant growth of ice crystals. The fat-free formulations encompassed within the scope of this invention contain a combination of mono-, di-, and polysaccharides, chemical emulsifiers and stabilizers in order to achieve a desirable level of freezer softness and storage stability. Various flavor and color agents, fruit solids, such as from fruit juices and fruit purees, and food acids may also be included in these formulations. All percentages and ratios given in this disclosure (except % overrun) are given as weight percents, unless otherwise indicated. The formulations of this invention are preferably free of all dairy ingredients such as non-fat milk solids, whey, lactose, etc. and are also preferably protein-free. Fruit pieces such as whole fruit pieces or pieces of infused whole fruit which would constitute a discontinuous or mix-in phase are not part of the base water ice formulations of this invention.

According to this invention the base formulations contain a water level of from about 50 to 68%, a total carbohydrate level, including carbohydrate present in any included fruit solids, of from 28 to 45%, food acids at a level of up to 1%, preferably from 0.2 to 0.8%, chemical emulsifiers in an amount of from 0.05 to 0.4% and hydrocolloid stabilizer at a level of up to 0.5%, preferably from 0.1 to 0.4%. It has further been found that the formulations must contain a minimum amount of polysorbate 80, a well-known and commercially-available mixture of polyoxyethylene esters of mixed partial oleic esters of sorbitol anhydrides, as all or part of the chemical emulsifier component.

The ratio of higher saccharides to the combined mono- and disaccharides and the ratio of disaccharides to monosaccharides fulfill the relationship set forth in U.S. Pat. Nos. 4,374,154 and 4,452,824. More specifically, the weight ratio of higher saccharides (i.e., three or more saccharide units) to mono and disaccharides (Ratio 1) and the weight ratio of disaccharides to monosaccharides must satisfy the relationship of $7 \leq (28 \times \text{Ratio 1}) + \text{Ratio 2} \leq 28$. Preferably Ratio 1 and Ratio 2 satisfy the relationship $24 \leq (80 \times \text{Ratio 1}) + (3 \times \text{Ratio 2}) \leq 64$, and further it is desirable that Ratio 1 possesses a value of from 0.25 to 0.45 and the Ratio 2 have a value of from 0.90 to 9.0. In the case of formulations which contain polyols and sugar alcohol ingredients it may be further desirable that $11 \leq (28 \times \text{Ratio 1}) + \text{Ratio 2} \leq 28$, that $34 \leq (80 \times \text{Ratio 1}) + (3 \times \text{Ratio 2}) \leq 64$ and/or that Ratio 1 is from 0.36 to 0.70.

When formulating in accordance with this invention, sufficient low molecular weight saccharides are present to depress the freezing point of the formulation several degrees but not sufficient to preclude the formation of ice crystals during product preparation. An absence of ice crystals is undesirable since the product will then not provide the desired and expected coldness impact which the consumer associates with the experience of eating sherbet or water-ice.

The formulation and processing parameters of this invention combine to yield a fruit-flavored, fat-free water-ice product having a smooth texture comparable to this present in conventional sherbet products. The formulations of this invention are prepared using conventional mixing techniques and are frozen using continuous freezing equipment. The products will have an overrun of from about 20 to 100% and an ice crystal size comparable to that present in conventional ice cream and sherbets.

The term "carbohydrate" or "saccharide" as used in this disclosure is meant to include soluble compounds composed of carbon, hydrogen and oxygen in which the latter two elements are in the same proportion as in water as well as functionally equivalent materials such as sugar alcohols (e.g., mannitol, sortitol, etc.) and polyhydric alcohols (e.g., glycerol). Thus the terms include sugars (e.g., dextrose, fructose, galactose, sucrose, etc.), starch hydrolyzates, polyols and the like. Macromolecular carbohydrates, such as natural gums (e.g., locust bean guar, etc.) which may be incorporated as stabilizers at low levels within the product formulations are not to be included when calculating carbohydrate level or saccharide distribution in accordance with this invention.

According to this invention, it is possible to formulate soft from the freezer fat-free, water-ice products which possess the organoleptic properties of taste, texture and mouthfeel of conventional soft serve ice cream. The products of this invention have the ability to be extruded as a continuous ribbon via manual pressure immediately upon removal from a freezer as cold as 0° F. These products will also be tolerant to extended freezer storage of several months and repeated thermal shocks without a significant deterioration of the ice crystal structure. In other words the products of this invention are resistant to the development of large ice crystals during prolonged storage such as would be required for the commercial distribution of the product over large geographical areas and the subsequent storage of the product in the home. Further the normal temperature variations and/or cycling which occur in commercial and household freezer equipment, especially those with frost-free operations, will not destroy the texture of the product.

The soft-frozen water ices of this invention possess unique texture and extrusion properties. The emulsifier system present in the fat-free and protein-free formulations of this invention unexpectedly contribute to providing a smooth texture, an ability to incorporate and maintain overruns in excess of 20% and improved extrusion properties. In the absence of the emulsifier system of this invention the product was hard to extrude, would not incorporate air above 20% overrun and had a coarse texture. It has been found that the addition of polysorbate 80 either alone or in combination with other emulsifiers is critical to the manufacture of a products which is perceived by the consumer as having the smooth texture of a fat and protein-containing sherbet products. The level of polysorbate 80 in the water ice formulation should be equal to or greater than 0.001% and preferably be equal to or greater than 0.01%.

A study was conducted to establish the effect of the presence of polysorbate 80 in fat-free and protein-free water ice formulations. A standardized base formulation having the following composition was utilized for this study.

| Component | Weight % |
|---|---|
| Water | 63.46 |
| Corn Syrup Solids | 14.87 |
| Dextrose | 12.79 |
| Sucrose | 7.81 |
| Stabilizer | 0.30 |
| Citric Acid | 0.25 |
| Emulsifier (as described below) | — |

Each formulation was passed through a continuous ice cream freezer where air was injected and the formulation was partially frozen. This partially-frozen material as then packed into single-service, extruder packages which contained a cone-shaped body portion and a preformed extrusion nozzle or fitment bonded to the open end of the cone. The force required to extrude the formulation from the cones at 5° F. (−15° C.) was obtained via a standardized testing methodology using an extrusion cell which measures the force in kilograms necessary to extrude the water ice product from the cone. All extrusion force measurements were made on duplicate cones and averaged. The overrun for all products which were extruded was 40% with the exception of 0% emulsifier level product where an overrun of 10% was the maximum level achievable.

TABLE 1

| Emulsifier Level | | Extrusion Force in Kg at 5° F. |
|---|---|---|
| 0 | No Emulsifier | 6.55 |
| 0.03 | Polysorbate 80 | 2.58 |
| 0.14 | (80% mono and diglycerides 20% Polysorbate 80) | 3.3 |
| 0.10 | Polysorbate 80 | 2.6 |
| 0.18 | (mono and diglycerides) | 5.35 |
| 0.14 | (sorbitan monostearate) | 7.1 |

Based on a correlation which has been established between instrumental and sensory measurement of extrusion forces, using a panel of six judges, it has been found that instrumental extrusion forces of about 4 kg represent samples which are moderately easy to extrude by an average individual. Extrusion force measurements of about 5.5 kg represent sample water ice products which are difficult to to extrude and extrusion forces of 7.0 or above represent products which are impossible to extrude. As can be seen from the results set forth in Table 1, conventional mono and diglyceride chemical emulsifiers and and monostearate chemical emulsifers do not produce an extrudable water ice product, whereas relatively low levels of polysorbate 80 are found to produce readily extrudable, fat-free and protein-free water ices.

The process for producing the soft, frozen water-ice formulations of this invention involve steps known in the manufacture of ice cream. Thus water and most of the dry ingredients are mixed together and pasteurized at suitable time and temperature conditions. The aqueous mix is then cooled and combined with additional ingredients such as heat-sensitive flavors, fruit purees etc. and passed to a continuous ice cream freezer where the mix is partially frozen and aerated. The freezer produces an ice slurry having an overrun of from 20 to 40% or more, and a temperature of about 10° to 20° F. (−12° to −7° C.). The slurry is then packaged and hardened at about −20° F. (−29° C.). This process is distinguished from ice cream manufacture, however, in that no homogenization step is employed.

Specific embodiments of the soft-frozen water-ice products of this invention are given in the following example:

EXAMPLE 1

A strawberry flavored water-ice was prepared by combining the following ingredients:

| Ingredient | Weight % |
|---|---|
| Water | 54.4 |
| Corn syrup solids (36 D.E.) | 14.8 |
| Dextrose (monohydrate) | 12.0 |

-continued

| Ingredient | Weight % |
| --- | --- |
| Strawberry puree (10% solids) | 10.0 |
| Sucrose | 7.4 |
| Flavor and Color | 0.5 |
| Citric Acid | 0.4 |
| Stabilizer (40% sodium alginate, 60% carrier) | 0.3 |
| Emulsifier (mono and diglycerides) | 0.18 |
| Emulsifier (polysorbate 80) | 0.03 |

The ingredients with the exception of the puree, flavors and citric acid were combined and pasteurized at 160° F. (71° C.) for ten minutes. This mix was then cooled to about 40° F. (4° C.) and combined with the remaining ingredients.

The mix was processed in a conventional ice cream freezer to a temperature of about 15° F. (−9° C.) and an overrun of 40% and then packaged in collapsible containers and frozen at −20° F. (−29° C.). The product was stored at 0° F. (−18° C.) where it maintained an extrudable consistency and possessed a smooth texture after six months storage.

EXAMPLE 2

Operating in accordance with Example 1 an orange-flavored water ice was prepared having the following formulation:

| Ingredient | Weight % |
| --- | --- |
| Water | 62.1 |
| Corn syrup solids (36 D.E.) | 14.8 |
| Dextrose (monohydrate) | 12.0 |
| Sucrose | 7.4 |
| Orange juice concentrate 65° Brix | 1.6 |
| Orange juice puree (6° Brix) | 1.0 |
| Flavor and Color | 0.4 |
| Stabilizer (as per Example 1) | 0.3 |
| Emulsifier (as per Example 1) | 0.21 |

The product maintained an extrudable consistency and possessed a smooth texture after six months storage at 0° F.

EXAMPLE 3

A fruit-containing, raspberry water-ice product was prepared by combining the listed ingredients to prepare a base formulation having a moisture content of 58.8% by weight.

| Ingredient | Weight % |
| --- | --- |
| Water | 30.23 |
| Corn Syrup Solids | 16.04 |
| Dextrose | 13.04 |
| Sucrose | 8.7 |
| Stabilizer (as per Example 1) | 0.22 |
| Emulsifier (as per Example 1) | 0.23 |
| Citric Acid | 0.27 |
| Color | 0.02 |
| Raspberry Puree | 4.89 |
| Fruit Juices | 23.91 |

-continued

| Ingredient | Weight % |
| --- | --- |
| Natural Raspberry Flavor Base | 2.45 |

The first six ingredients were combined, pasteurized and cooled as per Example 1. Thereafter the citric acid, color, puree, fruit juices and flavor base was added. This base formulation was passed through an ice cream freezer from which it exited at 15° F. and an overrun of 50%. Infused raspberry pieces (62% solids) were then blended into the soft-frozen base formulation at a level of 8% by weight of the base using an ingredient feeder before the product was packaged and frozen at −20° F. After one-month, storage at 0° F. the packaged soft-frozen water ice was both extrudable and smooth textured and comparable to the consistency and texture of Examples 1 and 2 after one month at 0° F. The six-month storage stability of this Example is projected to be comparable to that of Examples 1 and 2.

EXAMPLE 4

A fruit-containing, orange water-ice product having a total moisture content (excluding orange pieces) of 59.0% was prepared as in Example 3 by combining the ingredients listed below to prepare a base formulation and then adding infused mandarin orange pieces (40% solids) to the soft-frozen base at an 8% level.

| Ingredient | Weight % |
| --- | --- |
| Water | 29.75 |
| Corn Syrup Solids | 16.04 |
| Dextrose | 13.04 |
| Sucrose | 8.7 |
| Stabilizer (as per Example 1) | 0.22 |
| Emulsifier (as per Example 1) | 0.23 |
| Citric Acid | 0.22 |
| Flavor and Color | 0.17 |
| Orange Cell Sacs | 2.17 |
| Fruit Juices | 29.46 |

This soft-frozen orange water-ice product possessed a freezer storage stability comparable to that of Example 3.

Having thus described the invention what is claimed is:

1. A frozen, aerated fat-free and protein-free water-ice product which is extrudable by hand from a collapsible package at temperatures between 0° F. and 10° F., said product having an overrun of from 20 to 100%, a water content of from 50 to 68% by weight, a total carbohydrate content of from 28 to 45% by weight, food acid at up to 1% by weight, chemical emulsifiers at from 0.05 to 0.4% by weight including at least 0.01% polysorbate 80 and hydrocolloid stabilizers up to 0.5% by weight.

2. The product of claim 1 wherein the product is free of dairy ingredients.

3. The product of claim 2 wherein the product is fruit flavored.

4. The product of claim 3 wherein the product contains natural fruit solids.

5. The product of claim 4 wherein the product contains fruit juice and fruit puree.

6. The product of claim 5 wherein the product contains fruit pieces.

* * * * *